United States Patent Office 3,300,489
Patented Jan. 24, 1967

3,300,489
STEROIDAL C-17 SPIROLACTONES AND PROCESSES AND INTERMEDIATES USED IN THE PREPARATION THEREOF
Kenneth G. Holden, Stratford, N.J., assignor to Smith Kline & French Laboratories, Philadelphia, Pa., a corporation of Pennsylvania
No Drawing. Filed July 24, 1964, Ser. No. 385,042
14 Claims. (Cl. 260—239.57)

This invention relates to new steroid compounds characterized by having a spirolactone group at position 17. Furthermore, this invention relates to new processes and intermediates for preparing these steroidal lactones. The compounds of this invention have various biological activities such as inducing cholesterol lowering, diuretic, body weight lowering and anti-inflammatory activities. This aspect of the invention is presented in more detail hereafter. The end product lactones of this invention also are useful intermediates for the preparation of the well known anti-aldosterone compound, spironolactone, and its substituted congeners by chemical methods known to those skilled in the art.

The nub of this invention will be obvious from the following reaction sequences:

(A)

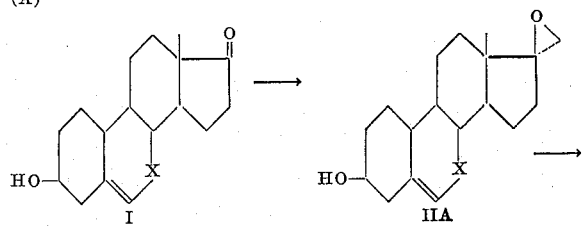

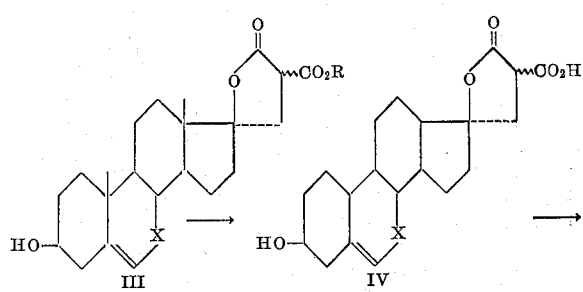

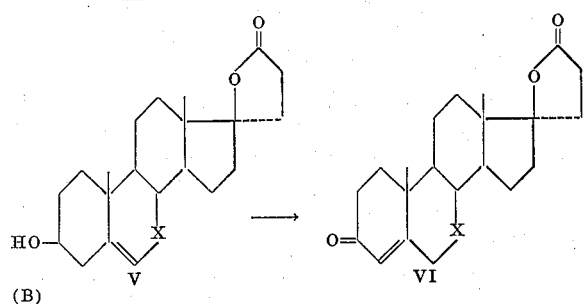

(B)

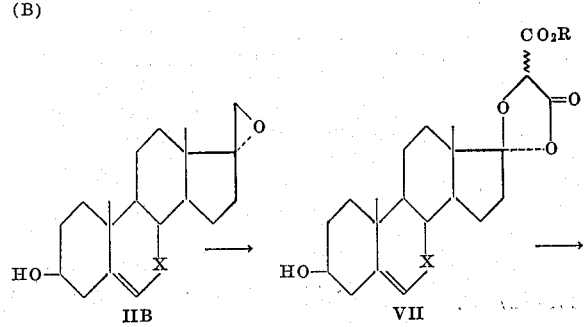

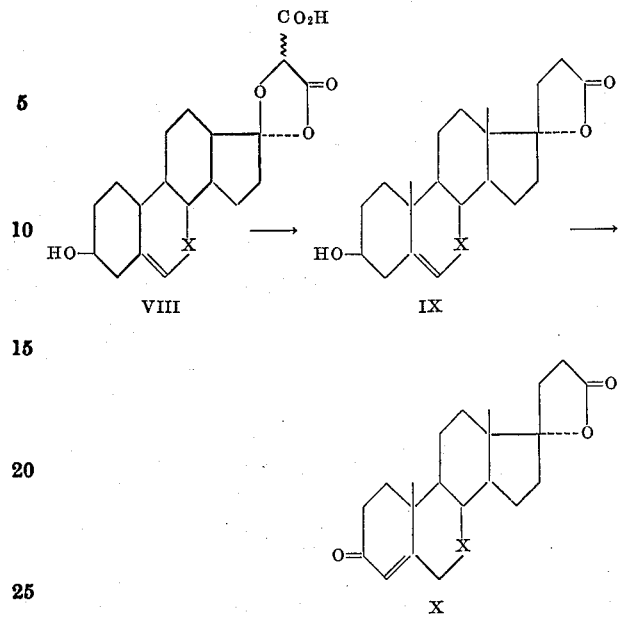

In the above sequences (A) and (B), R represents lower alkyl such as from 1–6 carbon atoms preferably methyl or ethyl and X represents a single bond or a methylene group, i.e., compounds in the B-nor or normal series respectively.

The important intermediate 17,20-epoxy-3β-hydroxy-21-nor-17-isopregn-5-enes of Formula II are prepared conveniently by reacting dehydroepiandrosterone or its B-nor congener (I) with trimethylsulfoxonium iodide or an equivalent triloweralkysulfoxonium halide in an anhydrous organic solvent preferably in the presence of an alkali agent such as sodium or potassium hydride, sodium or potassium lower alkoxides. The reaction is usually carried out at about room temperature. The isomeric 17α and 17β-epoxides (II A & B) are separated from the reaction mixture by fractional crystallization or chromatography.

Certain of these compounds also have shown substantial biological activity. For example, 17α,20-epoxy-3β-hydroxy-21-norpregn-5-ene has demonstrated anti-androgenic and weight lowering activity. In contrast, the 17β isomers of structure II do not have anti-androgenic activity.

We have found unexpectedly that the 17,20-epoxides can be condensed with various compounds known to the art as having active methylene groups such as malonic acid esters, acetoacetic esters, etc. Such condensations are usually carried out in the presence of an acid binding or alkali agent such as sodium or potassium hydride, methylate, ethylate or amide. The solvent is any anhydrous organic solvent unreactive with the ingredients such as toluene, benzene, xylene, ethanol or methanol. The reaction is usually carried out at temperatures from about room temperature to the reflux temperature of the reaction mixture. The resulting products are the 3β,17-dihydroxypregn-5-ene γ-lactone isomers optionally substituted in the lactone ring α to the lactone group depending on the active methylene reagent used such as having a carbalkoxy group at position 21 (III or VII) using a malonic acid ester.

In the preferred and exemplary series, the 21-carbalkoxy lactone intermediates (III and VII) are hydrolyzed usually by weak alkali such as alcoholic sodium or potassium hydroxide solutions to the corresponding carboxylic acids (IV and VIII) which are decarboxylated by heating at temperatures above their melting points to the unsubstituted lactones (V and IX). These compounds can then be converted to the active parent by mild oxidation such as using chromic acid in a suitable organic solvent such as acetone then completion of the shifting of the double bond from position 5, 6 to 4, 5 by treatment with acid. Other modifications of these spironolactone congeners can be prepared by methods known to the art such as inserting an acetylthio group at position 7α. (See Steroid Drugs, Applezweig, p. 217 (1962); U.S. Pat. No. 3,043,837, U.S. Pat. No. 2,938,031, U.S. Pat. No. 2,925,416 and U.S. Pat. No. 3,103,510.)

The spirolactone compounds in the B-nor series have shown particular activity as cholesterol lowering compounds especially 17β-hydroxy-3-oxo-17-iso-B-norpregn-4-ene-21-carboxylic acid γ-lactone.

The 4-en-3-one congeners of the 17,20-epoxy compounds of this invention (IIA & B) are prepared by Oppenauer oxidation at position 3. These compounds are important intermediates. 17β,20-epoxy-21-nor-17-isopregn-4-en-3-one in addition has significant anti-androgenic and anti-inflammatory activity.

It will be apparent to those skilled in the art that certain variations of this invention not precisely described herein can be carried out. For example, the O-acetate or other acylate derivatives of the compounds described can be prepared using known synthetic methods and are substantially equivalent to the hydroxyl parents. The term "alkali metal" is used to define salts of sodium or potassium used as condensing agents or acid binding agents. The term "lower" used together with a hydrocarbon-containing chemical name is used to denote a preferred carbon range of from 1-6. Other larger chains may be optionally used but usually to no further advantage. The following examples are designed to illustrate but not limit this invention:

Example 1

To a solution of 112.5 g. of trimethylsulfoxonium iodide, previously prepared from dimethyl sulfoxide and methyl iodide, in 1 liter of dimethyl sulfoxide is added 22.8 g. of 54% sodium hydride as a mineral oil suspension. The addition and subsequent reaction are carried out at room temperature under nitrogen with stirring. Ten minutes after the addition of sodium hydride is complete 46.5 g. of dehydroepiandrosterone is added in portions. After stirring for 5 hours the resulting solution is allowed to stand at room temperature for 24 hours. The reaction mixture is then diluted with benzene and poured into water. The benzene layer is separated. The aqueous phase is extracted with additional portions of benzene. The combined and dried benzene extracts are evaporated to a residue which is crystallized from acetone to give 17β,20-epoxy-3β-hydroxy-21-nor-17-isopregn-5-ene M.P. 174-176° C.

The mother liquors from the above crystallization is evaporated to a residue, dissolved in benzene-petroleum ether (1:1) and chromatographed over 700 g. of activity III Woelm alumina. Elution with benzene-petroleum ether (1:1) gives additional 17β,20-epoxy-3β-hydroxy-21-nor-17-isopregn-5-ene while elution with methylene chloride gives the isomeric epoxide, 17α,20-epoxy-3β-hydroxy-21-norpregn-5-ene which melts at 142-145° C. after recrystallization from acetone-hexane.

Example 2

A solution of 8.0 g. of 17β,20-epoxy-3β-hydroxy-21-nor-17-isopregn-5-ene in 600 ml. of toluene containing 110 ml. of distilled cyclohexanone and 5.8 g. of aluminum isopropoxide is slowly distilled during 3 hours so that the reaction mixture is reduced to about half of its original volume. After cooling to room temperature the reaction mixture is treated with 12 ml. of water and the resulting precipitate is removed by filtration. The filtrate is next steam distilled until the distillate is clear and the cooled nonvolatile aqueous mixture is extracted with ethyl acetate-ether. Evaporation of the organic solvents gives a crystalline residue of 17β,20-epoxy-21-nor-17-isopregn-4-en-3-one which melts at 173-175° C. after recrystallization from acetone.

Example 3

To a solution of 0.95 g. of sodium metal in 30 ml. of anhydrous ethanol is added 6.6 g. of diethyl malonate. Then, at reflux, 5.00 g. of 17β,20-epoxy-3β-hydroxy-21-nor-17-isopregnan-5-ene is added slowly. The reaction is carried out under nitrogen with stirring. After 16 hours the warm solution is poured into excess cold dilute hydrochloric acid and extracted with methylene chloride. After washing the methylene chloride extracts with aqueous sodium bicarbonate they are dried and evaporated to a residue of crude 3β,17β-dihydroxy-21-ethoxycarbonyl-17-isopregn-5-ene-21-carboxylic acid γ-lactone which melts at 197-199° C. after recrystallization from acetone-hexane.

Example 4

A solution of 1.0 g. of 3β,17β-dihydroxy-21-ethoxycarbonyl-17-isopregn-5-ene-21-carboxylic acid γ-lactone in 100 ml. of 50% aqueous alcohol containing 1 g. of sodium hydroxide is refluxed for 2 hours. The cooled solution is poured into water, acidified with phosphoric acid and extracted with methylene chloride to give 3β,17β-dihydroxy-17-isopregn-5-ene-21-dicarboxylic acid γ-lactone, M.P. 188-189° C., which is heated above its melting point to effect decarboxylation giving 3β,17β-dihydroxy-17-isopregn-5-ene-21-carboxylic acid γ-lactone, M.P. 182-185° C. after recrystallization from acetone-hexane. [J. A. Cella and C. M. Kagaiva, J. Am. Chem. Soc., 79, 4808 (1957), see also USP 2,705,712.]

Example 5

Similarly 3β,17α - dihydroxypregn-5-ene-21-carboxylic acid γ-lactone, M.P. 237-241° C. is prepared by the same route described above using 17α,20-epoxy-3β-hydroxy-21-norpregn-5-ene as starting material, the corresponding intermediates being 3β,17α-dihydroxy-21-ethoxycarbonyl-pregn-5-ene-21-carboxylic acid γ-lactone, M.P. 187-194° C., and 3β,17-dihydroxypregn-5-ene-21-dicarboxylic acid γ-lactone.

Example 6

To a solution of 8.2 g. of trimethylsulfoxonium iodide, previously prepared from dimethyl sulfoxide and methyl iodide, in 75 ml. of dimethyl sulfoxide is added 1.65 g. of 54% sodium hydride as a mineral oil suspension. The addition and subsequent reaction are carried out at room temperature under nitrogen with stirring. Ten minutes after the addition sodium hydride is completed 4.06 g. of B-nor-dehydroepiandrosterone [J. Joska, Coll. Czech. Chem. Commun., 25, 1086 (1960)] is added in portions, and after stirring for 5 hours the resulting solution is allowed to stand at room temperature for 24 hours. The reaction mixture diluted with benzene and poured into water, the benzene layer separated, and the aqueous phase extracted with additional portions of benzene. The combined and dried benzene extracts are evaporated to a residue which is crystallized from acetone-hexane to give 17β,20-epoxy-3β-hydroxy-21-nor-17-iso-B-norpregn-5-ene, M.P. 158-160° C. Evaporation of the mother liquor gives a residue which was a mixture of isomers containing 17α,20-epoxy-3β-hydroxy-21-nor-B-nor-pregn-5-ene, M.P. 115-127° C.

Example 7

To a solution of 1.84 g. of sodium metal dissolved in 50 ml. of absolute alcohol is added 12.8 g. of diethyl malonate with stirring under nitrogen. The reaction mixture is heated to reflux and 11.5 g. of 17β,20-epoxy-3β-hydroxy-21-nor-17-iso-B-norpregn-5-ene in 50 ml. of absolute alcohol is added slowly. The reaction mixture is refluxed for 16 hours, cooled, poured into excess cold 5% hydrochloric acid, and extracted with methylene chloride. The methylene chloride extracts are washed with aqueous sodium bicarbonate solution, dried and evaporated to a residue which is crystallized from ether-petroleum ether and then from acetone-hexane to give 3β,17β - dihydroxy-21-ethoxycarbonyl-17-iso-B-norpregn-5-ene-21-carboxylic acid γ-lactone, M.P. 163–164° C.

Example 8

To a boiling solution of 4.0 g. of 3β,17β-dihydroxy-21-ethoxycarbonyl - 17 - iso-B-norpregn-5-ene-21-carboxylic acid γ-lactone in 200 ml. of alcohol is added 200 ml. of 4.0 g. of sodium hydroxide. After boiling for 2 hours the solution is poured into water, acidified with phosphoric acid and extracted with ethyl acetate. Evaporation of the combined and dried ethyl acetate extracts gives a residue of 3β,17β-dihydroxy-17-iso-B-norpregn-5-ene-21-dicarboxylic acid γ-lactone, M.P. 230° C., which is heated above its melting point to effect decarboxylation giving 3β,17β-dihydroxy-17-iso-B-norpregn-5-ene-21-carboxylic acid γ-lactone, M.P. 247–252° C. after recrystallization from acetone-hexane.

Example 9

A solution of 1.74 g. of 3β,17β-dihydroxy-17-iso-B-norpregn-5-ene-21-carboxylic acid γ-lactone in 50 ml. of acetone is treated with 2 ml. of standard chromic acid reagent with stirring at room temperature. After 2 minutes the reaction mixture is poured into water and extracted with methylene chloride. The combined and dried methylene chloride extracts are treated with 2 ml. of concentrated hydrochloric acid in 20 ml. of methanol and, after standing at room temperature for two hours, washed then dried and evaporated to a residue. The residue is dissolved in benzene and chromatographed over 60 g. of activity III Woelm alumina. Elution with benzene gives 17β-hydroxy-3-oxo-17-iso-B-norpregn-4-ene-21-carboxylic acid γ-lactone, M.P. 152–153° C. after recrystallization from methylene chloride-ether.

Example 10

A solution of 4.0 g. of 17β,20-epoxy-3β-hydroxy-21-nor-17-iso-B-norpregn-5-ene in 350 ml. of toluene with 55 ml. of cyclohexanone and 2.9 g. of aluminum isopropoxide is slowly distilled during 3 hours. The reaction mixture is worked up as in Example 2 to give 17β,20-epoxy-19-nor-17-iso-B-norpregn-4-en-3-one.

What is claimed is:

1. The method of preparing steroidal spirolactones of the formula:

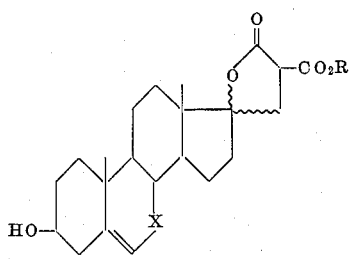

in which R is lower alkyl of from 1–6 carbon atoms and X is a member selected from the group consisting of a single C—C bond and methylene; comprising reacting a compound of the formula:

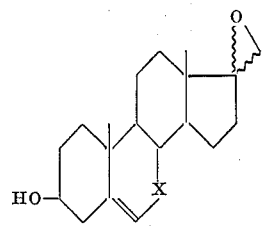

in which X is a member selected from the group consisting of a single C—C bond and methylene, with a lower alkyl malonate ester in the presence of a condensing agent selected from the group consisting of an alkali metal hydride, methylate, ethylate and amide.

2. The method of claim 1 characterized in that X is a single C—C bond.

3. A chemical compound of the formula:

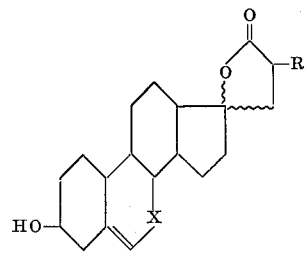

in which X is a member selected from the group consisting of a single C—C bond and methylene, and R is a member selected from the group consisting of lower carbalkoxy and carboxy.

4. 3β,17β-dihydroxy - 21 - ethoxycarbonyl-17-isopregn-5-ene-21-carboxylic acid γ-lactone.

5. 3β,17β-dihydroxy - 17 - isopregn-5-ene-21-dicarboxylic acid γ-lactone.

6. 3β,17β-dihydroxy - 21 - ethoxycarbonyl - 17 - iso-B-norpregn-5-ene-21-carboxylic acid γ-lactone.

7. 3β,17β-dihydroxy - 17 - iso-B-norpregn-5-ene-21-dicarboxylic acid γ-lactone.

8. A compound of the formula:

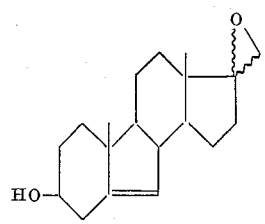

9. 17β,20-epoxy - 3β - hydroxy - 21 - nor-17-iso-B-norpregn-5-ene.

10. A compound of the formula:

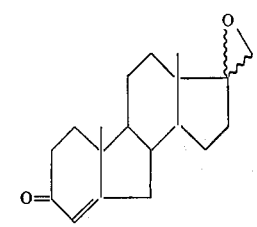

11. A compound of the formula:

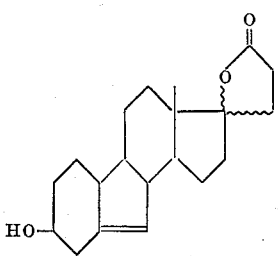

12. 3β,17β-dihydroxy - 17 - iso-B-norpregn-5-ene-21-dicarboxylic acid γ-lactone.
13. A compound of the formula:
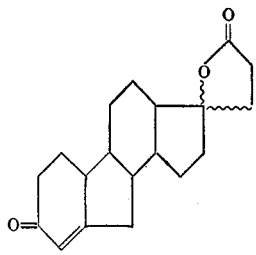
14. 17β-hydroxy - 3 - oxo-17-iso-B-norpregn-4-ene-21-carboxylic acid γ-lactone.
References Cited by the Examiner
UNITED STATES PATENTS
| | | |
|---|---|---|
| 2,265,143 | 12/1941 | Butenandt et al. ___ 260—239.55 |
| 2,846,451 | 8/1958 | Sondheimer et al. __ 260—397.3 |
| 3,083,200 | 3/1963 | Patchett et al. ____ 260—239.57 |
| 3,174,970 | 3/1965 | Muller et al. _____ 260—239.35 |
LEWIS GOTTS, *Primary Examiner.*
ELBERT L. ROBERTS, *Examiner.*